(12) United States Patent
Kiser

(10) Patent No.: US 7,578,488 B2
(45) Date of Patent: Aug. 25, 2009

(54) TEMPORARY ARM GAIN AND SADDLE

(75) Inventor: Anthony Kiser, Conyers, GA (US)

(73) Assignee: The Southern Company, Atlanta, GA (US)

( * ) Notice: Subject to any disclaimer, the term of this patent is extended or adjusted under 35 U.S.C. 154(b) by 110 days.

(21) Appl. No.: 11/344,781

(22) Filed: Feb. 1, 2006

(65) Prior Publication Data

US 2006/0180723 A1  Aug. 17, 2006

Related U.S. Application Data

(60) Provisional application No. 60/649,013, filed on Feb. 1, 2005.

(51) Int. Cl.
| A47B 96/06 | (2006.01) |
| A47G 29/00 | (2006.01) |
| A47K 1/00  | (2006.01) |
| E04G 1/00  | (2006.01) |

(52) U.S. Cl. ............... 248/218.4; 248/219.3; 52/40

(58) Field of Classification Search ........... 248/219.4, 248/218.4, 227.3, 65; 254/134.3 PA, 395; 52/40, 697, 686; 174/43, 149 R, 45 R
See application file for complete search history.

(56) References Cited

U.S. PATENT DOCUMENTS

| 219,644 | A |  | 9/1879 | McDermott |
| 842,222 | A |  | 1/1907 | Mead |
| 2,264,493 | A |  | 12/1941 | Werning |
| 2,430,259 | A |  | 11/1947 | Tichota |
| 2,450,730 | A |  | 10/1948 | Hord |
| 2,537,719 | A |  | 1/1951 | Tuepker |
| 2,844,643 | A |  | 7/1958 | Cofer et al. |
| 2,870,793 | A |  | 1/1959 | Bailey |
| 3,235,652 | A |  | 2/1966 | Lindsey |
| 3,429,758 | A |  | 2/1969 | Young |
| 3,446,582 | A | * | 5/1969 | Smith et al. ................. 423/310 |
| 3,499,973 | A |  | 3/1970 | Barnes |
| 3,562,403 | A |  | 2/1971 | Monahan et al. |
| 3,574,104 | A |  | 4/1971 | Medler |
| 3,813,837 | A |  | 6/1974 | McClain et al. |
| 4,025,824 | A | * | 5/1977 | Cheatham ................. 361/601 |
| 4,489,910 | A | * | 12/1984 | Ferguson ................. 248/219.4 |
| 4,728,749 | A | * | 3/1988 | Knight ..................... 174/45 R |
| 4,860,985 | A | * | 8/1989 | Olson et al. ............ 248/229.17 |
| 4,867,399 | A |  | 9/1989 | Thérond |
| 5,174,535 | A | * | 12/1992 | Stubbersfield ........... 248/316.1 |
| 5,228,657 | A | * | 7/1993 | Hall ....................... 248/230.9 |
| 5,445,348 | A | * | 8/1995 | Caldwell et al. .......... 248/74.1 |
| 5,605,017 | A | * | 2/1997 | Fingerson et al. ............ 52/40 |
| 5,769,556 | A | * | 6/1998 | Colley ....................... 403/24 |
| 5,876,000 | A | * | 3/1999 | Ismert ......................... 248/65 |
| 6,142,434 | A | * | 11/2000 | Trost et al. ............... 248/218.4 |
| 6,357,709 | B1 | * | 3/2002 | Parduhn ................. 248/229.17 |
| 6,378,821 | B1 | * | 4/2002 | McKelvy et al. ......... 248/218.4 |
| 6,517,052 | B1 | * | 2/2003 | Lake ................. 254/134.3 PA |

(Continued)

Primary Examiner—Amy J. Sterling
(74) Attorney, Agent, or Firm—Seyed Kaveh E. Rashidi-Yazd; Troutman Sanders LLP

(57) ABSTRACT

A non-boring support system, or a temporary arm gain, is described. The support system enables attaching a supporting arm to an existing utility pole. The support system can include a securing assembly and a mounting member. The securing assembly can define an aperture sufficiently large enough to receive and secure the supporting arm. The mounting member can be adapted to mount the securing assembly to the utility pole.

10 Claims, 12 Drawing Sheets

U.S. PATENT DOCUMENTS

| | | | |
|---|---|---|---|
| 6,766,992 B1 * | 7/2004 | Parker | 248/300 |
| 6,892,990 B2 * | 5/2005 | Pisczak | 248/74.4 |
| 7,216,850 B2 * | 5/2007 | Kwon | 254/395 |

* cited by examiner

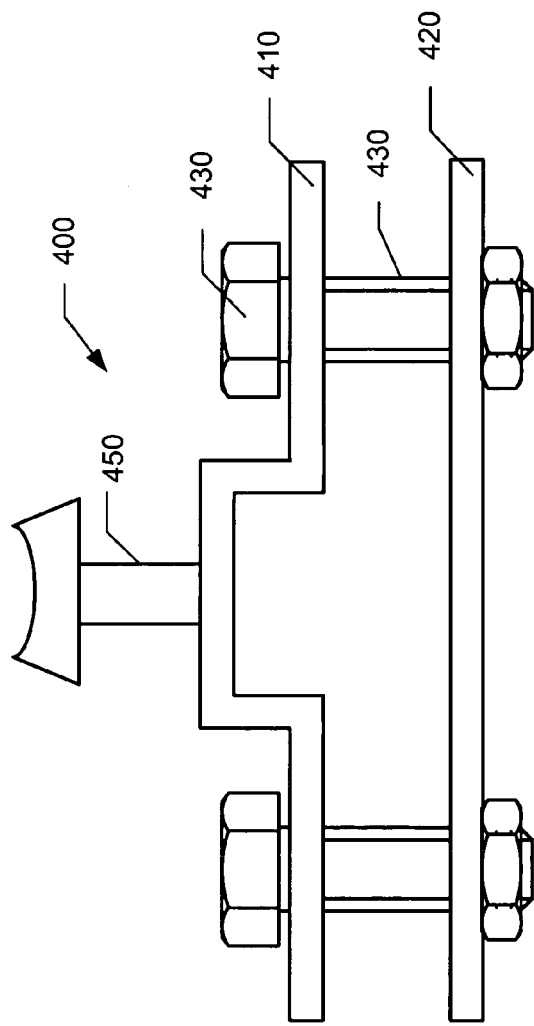
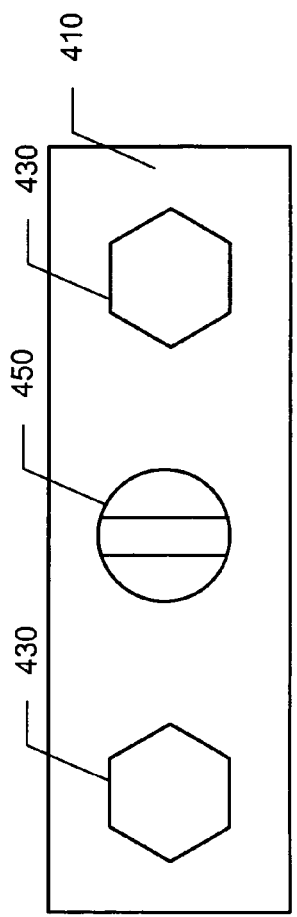

TEMPORARY ARM GAIN AND SADDLE

CROSS-REFERENCE TO RELATED APPLICATIONS

This application claims benefit, under 35 U.S.C. § 119(e), of U.S. Provisional Application Ser. Nos. 60/649,013, filed 1 Feb. 2005, the entire contents and substance of which are hereby incorporated by reference.

BACKGROUND

1. Field of the Invention

The present invention relates generally to utility line poles and, more particularly, to utility line supporting arms with at least one insulator saddle attached thereto, which temporarily attach to a utility line pole for transfer of utility line equipment.

2. Description of Related Art

Supporting members, or arms, for utility poles are well known in the art. In fact, different materials have been used to assist and safely stabilize the permanent attachment of a horizontal arm for supporting utility lines. Those skilled in the art would appreciate wood, aluminum, fiberglass, and the like can permanently fasten supporting members to utility line poles. The supporting arms hold the utility lines above the ground.

The related art predominately describes methods of permanently attaching a supporting arm horizontally to a utility pole. In fact, most of the related art methods require the boring of holes in the power poles and/or supporting arms to safely and securely affix the horizontal arm to the utility pole. Yet, it can be appreciated that many problems exist with such an approach, including, for example, the weight held by a particular arm changes over its lifetime and the need for temporary arms. As the weight is increased, the number of supporting members must be increased. Hence, the method of boring additional holes in the power poles and supporting arms for such supporting members decreases the lifespan of the poles and arms, and increases the cost to utility companies, as the company must purchase and install new poles and arms.

Utility line pole equipment is typified in U.S. Pat. No. 2,870,793 to Bailey, U.S. Pat. No. 3,235,652 to Lindsey, U.S. Pat. No. 3,429,759 to Young, U.S. Pat. No. 3,499,973 to Barnes, U.S. Pat. No. 3,562,403 to Monahan et al., U.S. Pat. No. 3,574,104 to Medler, U.S. Pat. No. 3,813,837 to McClain et al., and U.S. Pat. No. 4,867,399 to Thérond. Yet, none of these teach the use of temporary, lightweight utility arms attached to a utility pole. Each reference embodies disadvantages and limitations overcome by the present invention.

For example, U.S. Pat. No. 2,870,793 discloses a fiberglass arm, not the support or gain that passes it to the pole. It would be further understood by those skilled in the art that this is a permanent attachment to the electric utility pole. The Bailey device requires a complicated U-bolt system to attach the arm to the utility pole. Yet, this type of system makes the attachment more difficult and is more labor intensive to complete the attachment. The use of U-bolts and straps around the electric utility pole, along with a nut and bolt system, creates tedious work for utility linemen. Bailey further discloses the use of fiberglass as a supporting member in an electric utility pole or arm.

U.S. Pat. No. 3,235,352 relates to a utility line cross-arm. Like many utility arms, this arm holds wires and further includes a clamping means for attaching the wires to the arm for stability. Lindsey discloses boring holes in the electric utility pole, thus creating a permanent attachment. The boring of holes in the electric utility pole over time weakens the pole/arm.

U.S. Pat. No. 3,499,973 discloses support brackets for standoff insulators. Barnes discloses first boring holes in the electric utility pole to attach a bracket, and then attaching the insulators to the bracket. Barnes is a permanent attachment to the electric utility pole.

The permanent attachments of the above-discussed art are facilitated by boring holes in the utility poles, or using large nut-and-bolt systems. The boring of holes in supporting arms is disadvantageous, as it decreases the lifespan and stability of utility poles and utility arms, and further results in additional costs to the utility company to replace the bored poles and arms. Additionally, arms can be extremely heavy and are often unable to withstand additional weight from the attached utility lines.

Supporting arms often comprise an attached insulator saddle. The saddle can be attached to the supporting arm, and used to hold wires in place.

Insulators are typified in U.S. Pat. No. 219,644 to McDermott et al., U.S. Pat. No. 842,222 to Mead, U.S. Pat. No. 2,264,493 to Werning, U.S. Pat. No. 2,430,259 to Tichota, U.S. Pat. No. 2,450,730 to Hord, U.S. Pat. No. 2,537,719 to Tuepker, and U.S. Pat. No. 2,844,643 to Cofer et al. Yet, none of these insulators provide a solution to the constant boring of the holes in the supporting arm for the insulators.

For example, U.S. Pat. No. 219,644 discloses an insulator for a telegraph pole. McDermott et al. discloses a permanent attachment of the insulator to the arm. Yet, the insulator can only be located in one place on the supporting arm. In addition, the McDermott et al. insulator is of a limited type that can be attached to the supporting arm.

U.S. Pat. No. 2,264,493 refers to a fence post. The screw used in Werning pierces the channel to which it is attached. Consequently, this reference teaches a permanent attachment.

U.S. Pat. No. 2,537,719 discloses an insulator and support for electric fences. Tuepker discloses the capability of withstanding only a lightweight load, and thus unsuitable in utility applications. Further, Tuepker is another example of a permanent fixture.

Accordingly, it would be beneficial to provide lightweight utility line supporting arms, which can temporarily attach to an utility pole for transfer of utility line equipment, and it would be further beneficial to have at least one insulator saddle attached. It is to the provision of such a device that the present invention is primarily directed, which overcomes the above-listed disadvantages.

SUMMARY OF THE INVENTION

The present invention includes a process of releasably connecting an arm to a utility pole. In a conventional process of attaching an arm to a utility pole, the conventional process can include a boring support system. The boring support system can include (i) boring a hole into the utility pole, (ii) boring a hole into the arm, and (iii) permanently fastening the arm to the utility pole via a bored fastening means, wherein the integrity of both the utility pole and the arm are compromised with bores. The improved process comprises releasably securing the arm to the utility pole via a non-boring support system, wherein the non-boring support system is capable of securely attaching the arm and the utility pole when a load on the arm includes utility lines.

The improved process includes the non-boring support system releasably securing the arm to the utility pole for temporarily supporting the arm during a reconducting process.

The non-boring support system of the improved process can include a securing assembly defining a pathway sufficiently sized to securedly house the arm in an approximately normal orientation to the utility pole; and a mounting member to releasably secure the securing assembly to the utility pole.

The securing assembly can include a lining of the pathway adapted to reduce the amount of lateral slippage of the arm in the non-boring support system. The securing assembly can further comprise a hingeably connected locking device adapted to fully envelope at least a portion of the arm within the non-boring support system. The securing assembly can further include a three-sided housing, wherein the locking device is sealable at a top of the housing. The locking device can in another embodiment secure the arm in the securing assembly with a clamping device.

The mounting member can include at least one aperture cooperatively shaped to receive a bolt of the utility pole for mounting the non-boring support system to the utility pole. The mounting member can include at least two chain receiving pathways for receiving a chain, wherein the chain wraps around the utility pole to secure the non-boring support system to the utility pole, without boring holes in the utility pole. A rear of the mounting member can be cooperatively shaped with the utility pole for flush fitting with the utility pole.

Moreover, a non-boring support system for supporting a temporary supporting arm for use in a reconducting process in an approximately normal orientation to a utility pole can comprise a securing assembly having a housing defining a pathway for receiving the supporting arm, the securing assembly having a locking device for releasably securing a portion of the supporting arm within the housing of the securing assembly; and a mounting member for releasably securing the securing assembly having the supporting arm to the utility pole.

Additionally, the non-boring supporting system can further include a saddle positioned on the supporting arm. The saddle provides an insulation from a conductor to the supporting arm. The saddle can comprise a first seat and a second seat for a non-boring assembly with the supporting arm. The first seat of the saddle can comprise a connector. The second seat of the saddle can also comprise a connector. Indeed, the connector of the first seat and the connector of the second seat can be selected from the group consisting of an insulator pin, a dead end eye, a brace, a snatch block, and a conductor roller.

The non-boring support system can further comprise a supporting arm for supporting one or more conductors a predetermined distance above the ground. Also, the locking device can be hingeably connected to the securing assembly for securing the supporting arm into the pathway of the securing assembly.

The mounting member can be secured to the utility pole by a non-boring assembly. Indeed, a rear of the mounting member can cooperatively fit the shape of the utility pole for flush fitting with the utility pole.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 12A depicts a side view of another embodiment of the insulator saddle, in accordance with a preferred embodiment of the present invention.

FIG. 12B depicts a top view of the insulator saddle, in accordance with a preferred embodiment of the present invention.

DETAILED DESCRIPTION OF PREFERRED EMBODIMENTS

To facilitate an understanding of the principles and features of the invention, it is explained hereinafter with reference to its implementation in an illustrative embodiment. In particular, the invention is described in the context of a support system for securing a utility arm to a utility pole.

Figure 1:
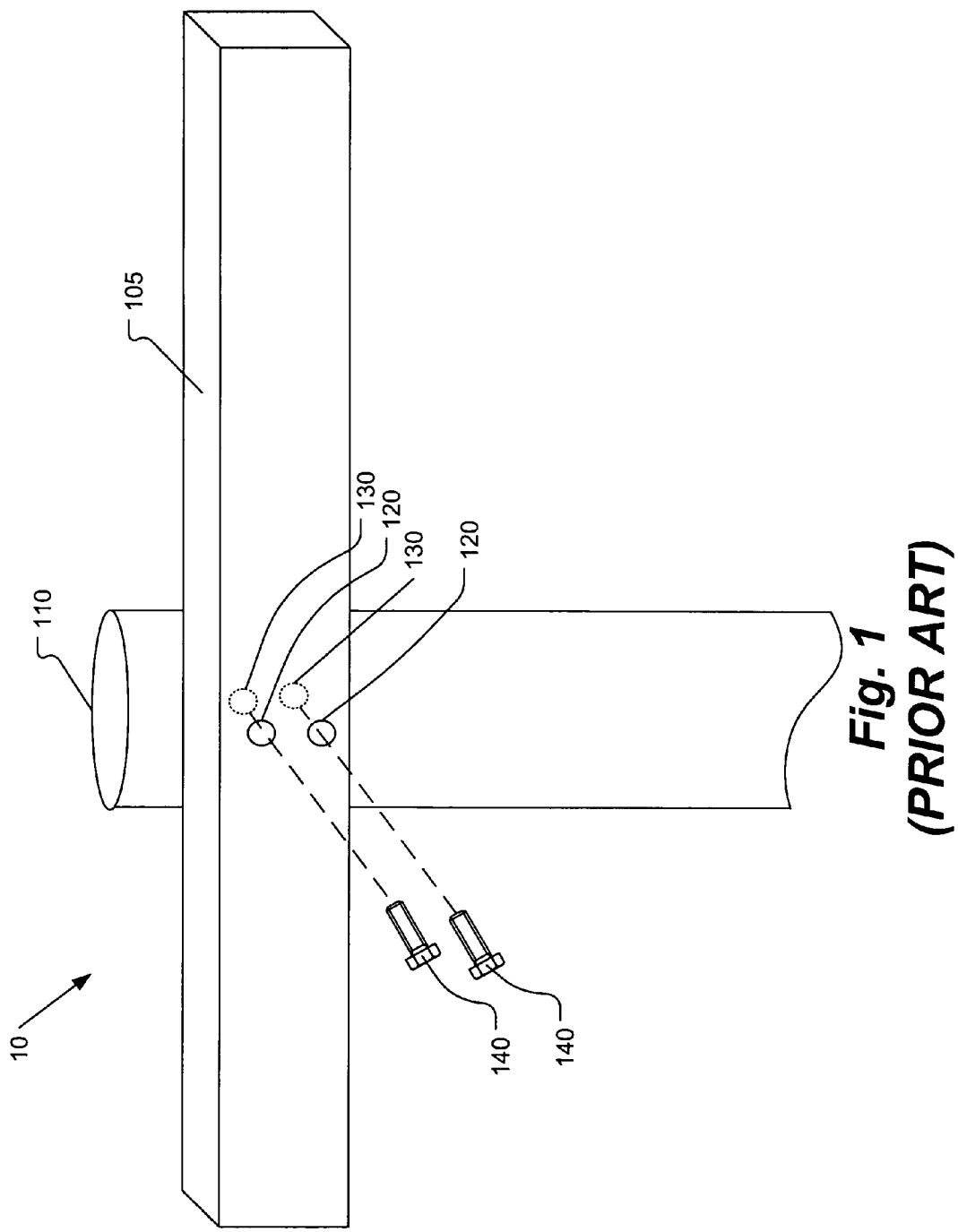
FIG. 1 depicts an exploded view of a conventional system of securing a supporting arm to a utility pole by boring holes.

FIG. 1, however, illustrates a conventional system of mounting and securing the arm 105 to the pole 110 by boring a hole into an arm 105 and a utility pole 110. A boring assembly 10 connected the arm 105 to the pole 110. Conventionally, in order to secure the arm to the pole 110, a hole 120 must be bored into the arm 105. In addition, a hole 130 must be bored into the pole 110. Then, a fastening member, typically a bolt, 140 is inserted into the hole 120 of the arm 105 and the hole 130 of the pole 110, wherein the arm 105 is secured to the pole 110. Oftentimes, more than one hole 120 in the arm 105 and more than one hole 130 in the pole 110 must be bored to properly and effectively secure the arm 105 to the pole 110. After removing the arm 105 off the pole 110, utility companies were left with a number of bored holes in the arm 105 and the pole 110. In fact, after a few installations of the arm to the pole linemen referred to the arms and poles as Swiss cheese. Thus, after a few times of securing the same arm 105 to one or more poles 110, the arm 105 cannot be used again. Moreover, eventually the pole 110 must even be replaced; which is costly. It is therefore necessary to improve the process of securing arms 105 to poles 110.

Referring now in detail to the drawing figures, wherein like reference numerals represent like parts throughout the several views, the present invention comprises a non-boring support system.

Figure 2:
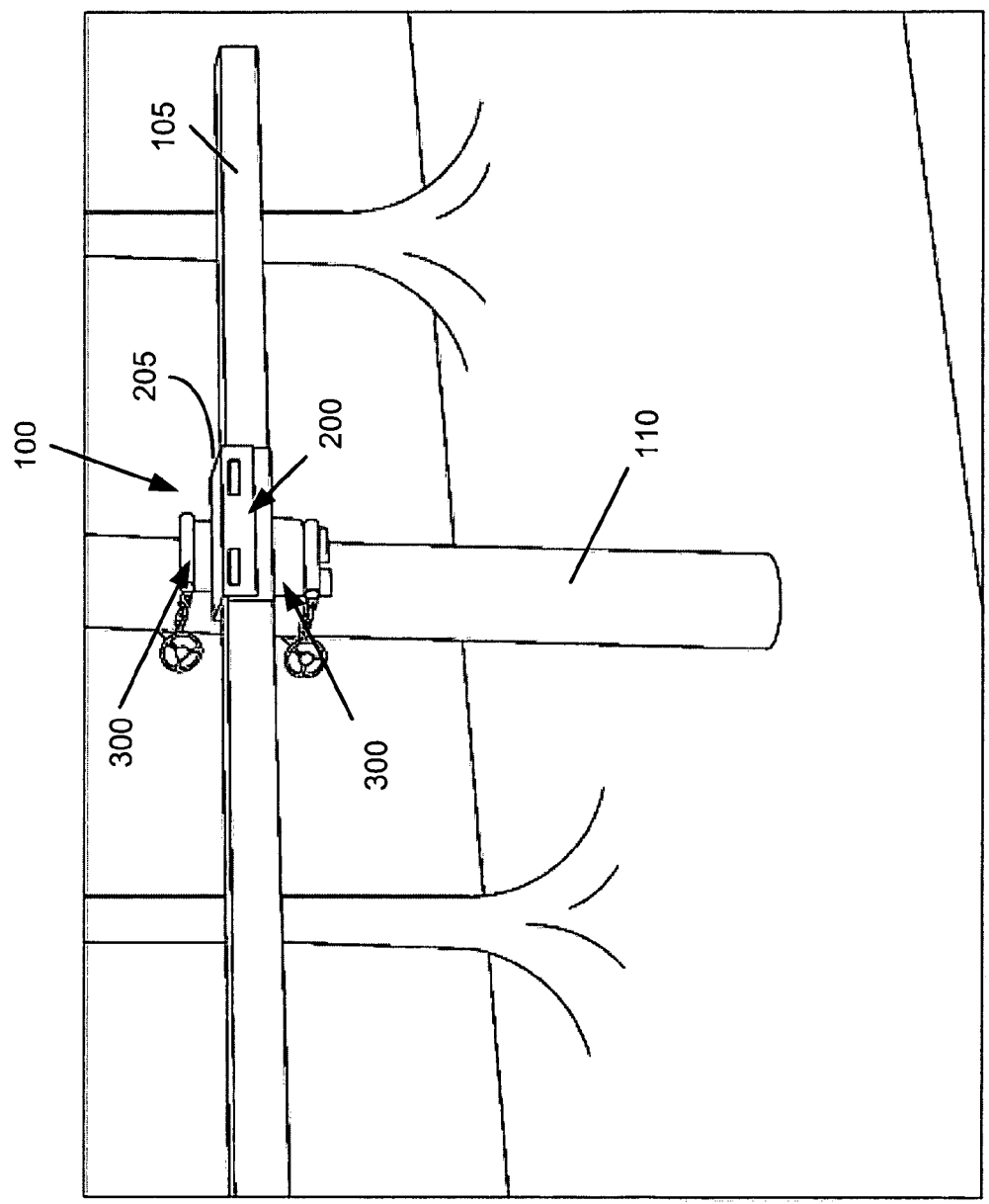
FIG. 2 depicts the support system secured to a utility pole including a supporting arm, in accordance with a preferred embodiment of the present invention.

As illustrated in FIG. 2, and in accordance with a preferred embodiment of the present invention, the support system 100 enables attaching a supporting arm 105 to a utility pole 110. The support system 100 can include a securing assembly 200 and a mounting member 300. The securing assembly 200 can envelope the arm 105 to be secured to the pole 110, wherein not requiring boring a hole into the arm 105 to securedly and safely secure the arm 105 to the pole 110. The securing assembly 200 can comprise a housing 210 defining a channel or pathway 205 sufficiently large enough to receive and secure the supporting arm 105. The mounting member 300 is used to attach the securing assembly 200 to the pole 110. The mounting member 300 can be adapted to mount the securing assembly 200 to the utility pole 110.

The present invention, the supporting system 100, eliminates the need of boring holes in the arm 105; therefore, the arm 105 can be reused. The support system 100 is adapted to hold the supporting arm 105 to the utility pole 110 in a non-boring assembly.

Preferably, the support system 100 can secure the supporting arm 105 approximately normal to the pole 110; hence, the supporting arm 105 rests horizontally. Utility poles 110—commonly referred to as power poles, electric utility poles, telephone poles, and the like—are often manufactured with wood, aluminum, steel, fiberglass, concrete, and the like. The supporting arm 105 can be manufactured of the same or like material to that of the utility pole 110. Moreover, the supporting arm 105, in an effort to lighten the load, can be manufactured having a portion of the center being hollow.

The present supporting arm 105 is adapted to be, preferably, temporarily attached to a utility pole to aid linemen in the transfer of lines in an upgrade, for example, reconducting. Reconducting refers to a method of upgrading conductors in a distribution or transmission electrical system. For example, a residential area receiving a load can increase in population. As a result of this increase in population, an electric utility company must provide more electricity to a given area. Commonly, this is accomplished by providing larger conductor size (typically, a conductor having a larger diameter is installed). In an effort to ease the responsibility of linemen, a temporary supporting arm 105 can be attached to an electric utility pole 110. This supporting arm 105 can assist with moving the old conductors (smaller diameter conductors) out of the way and to pull new conductors (larger diameter conductors) to attach to the electric utility pole 110. This transition assists the linemen with the changing of conductors and eases the overall process. Other utility companies can use the reconducting process to provide new, larger, and/or improved lines to their customers.

In the reconducting example, the temporary supporting arm 105 holds the existing energized lines out of the way, preferably safely above the ground, while new lines and wiring are installed. In conventional systems, lines were too heavy for wooden cross arms, wherein wooden cross arms were bored to attach to the pole.

In a conventional process of attaching an arm 105 to the pole 110, the process includes a first boring of the pole 110, a second boring of the arm 105, and fitting the arm 105 to the pole 110, wherein the arm 105 is secured to the pole 110 by a fastening member 140 through the bored holes in the arm 105 and the pole 110. An improved method of securing the arm 105 to the pole 110 includes removing the steps of boring a hole into the arm 105 and boring a hole into the pole 110, and strapping the arm 105 to the pole with a support system 100.

Figure 3:
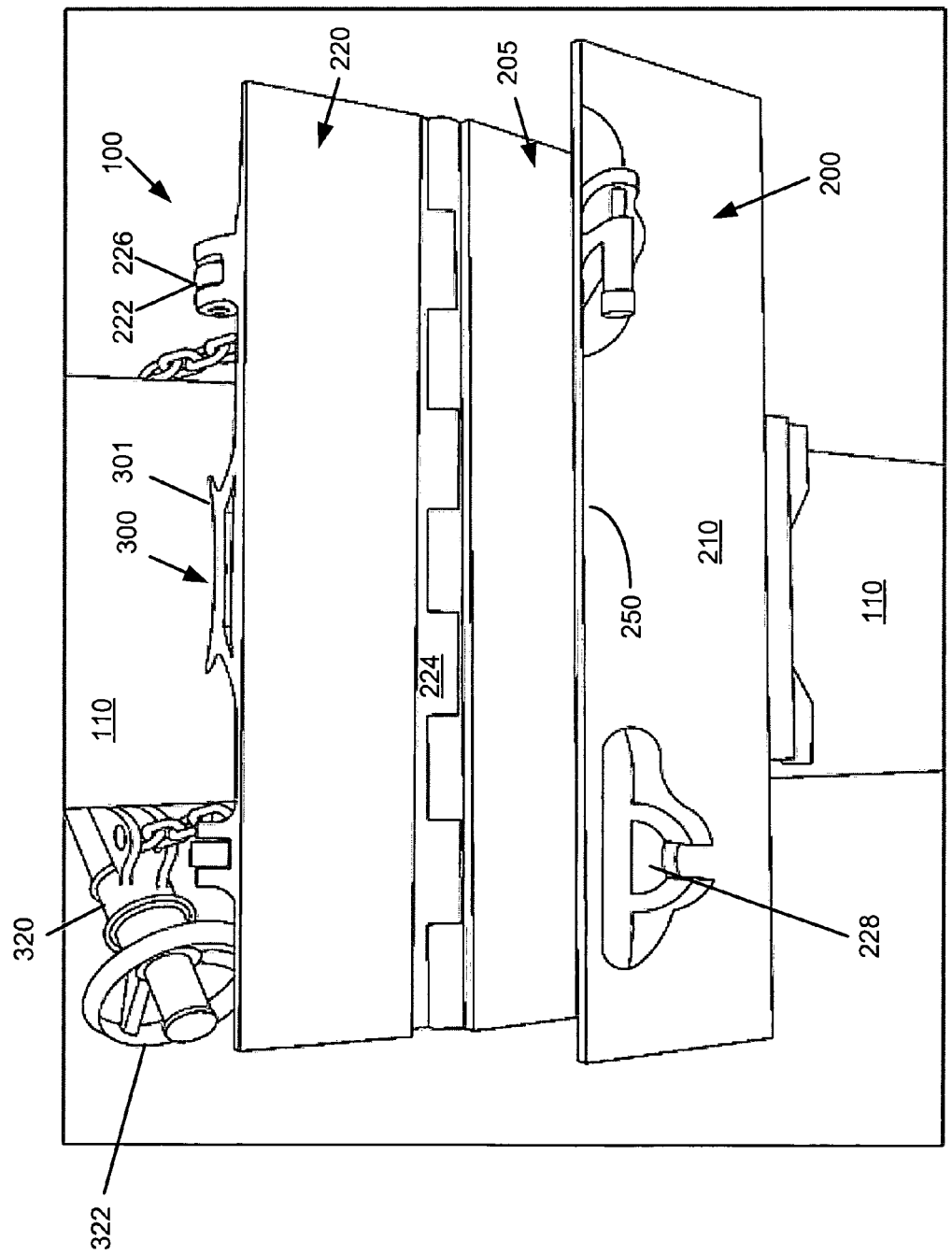
FIG. 3 depicts a front perspective view of the support system, in accordance with a preferred embodiment of the present invention.

Referring now to FIG. 3, the securing assembly 200 of the support system 100 can include a housing 210 and a locking device 220. The housing 210 can include the pathway 205 and a liner 212. The locking device 220 can include a fastening element 222 and a hinge member 224.

The housing 210 of the securing assembly 200 is adapted to house or envelope the supporting arm 105, therein reducing, if not eliminating, the need of boring holes in the arm 105. Indeed, the pathway 205 of the housing 210 can be adapted to receive the supporting arm 105.

The housing 210 can be manufactured with aluminum, stainless steel, and/or galvanized steel. Preferably, the housing 210 is manufactured with material that can withstand harsh environments and remain rather lightweight.

The housing 210 of the securing assembly 200, preferably, has a pathway 205 that is sufficiently large enough to receive the supporting arm 105. Indeed, the housing 210 can be manufactured to the shape of the supporting arm 105. For example, a preferred fiberglass supporting arm can have rectangular dimensions of 4 inches by 6 inches. The pathway 205 of the housing 210 is preferably manufactured slightly larger than the dimensions of the fiberglass supporting arm, in order to receive the arm. The dimensions of the pathway 205 can vary, for example, from a rectangular-shaped cavity to an eclipse, oval or circular cavity. Even though FIG. 1 illustrates a rectangular pathway 205 for the supporting arm 105, one skilled in the art would appreciate that the pathway 205 can have many different dimensions and shapes to receive many supporting arms 105.

It is preferred that length of the housing 210 be in the range of 6 inches through 48 inches. Having the length of the range within this range provides the necessary support to secure the supporting arm 105 to the pole 110.

The liner 212 of the housing 210 can be positioned in the pathway 205 to prevent slippage of the supporting arm 105. Indeed, the liner 212 of the securing assembly 200 can reduce, if not eliminate, slipping of the supporting arm 105 in the housing 210. Since the supporting arm 105 is secured by the locking device 220, the longitudinal movement (up and down) of the supporting arm 105 is secure. The lateral movement (side-to-side), however, is not secure; hence, the use of the liner 212. The liner 212 can be composed of a sheet of plastic to grip the supporting arm 105. The liner 212 can also be constructed from other polymer materials, such as polyolefins, such as, but not limited to ultra-high molecular weight (UHMW) polyethylenes, low, medium, and high density polyethylenes, polyurethanes, polyamides, and copolymers, and combinations thereof. The material selected for the liner 212 can include ridges, be weatherproof, and/or be flexible enough to have some give as the supporting arm 105 is inserted in the pathway 205 of the housing 210.

Figure 4:
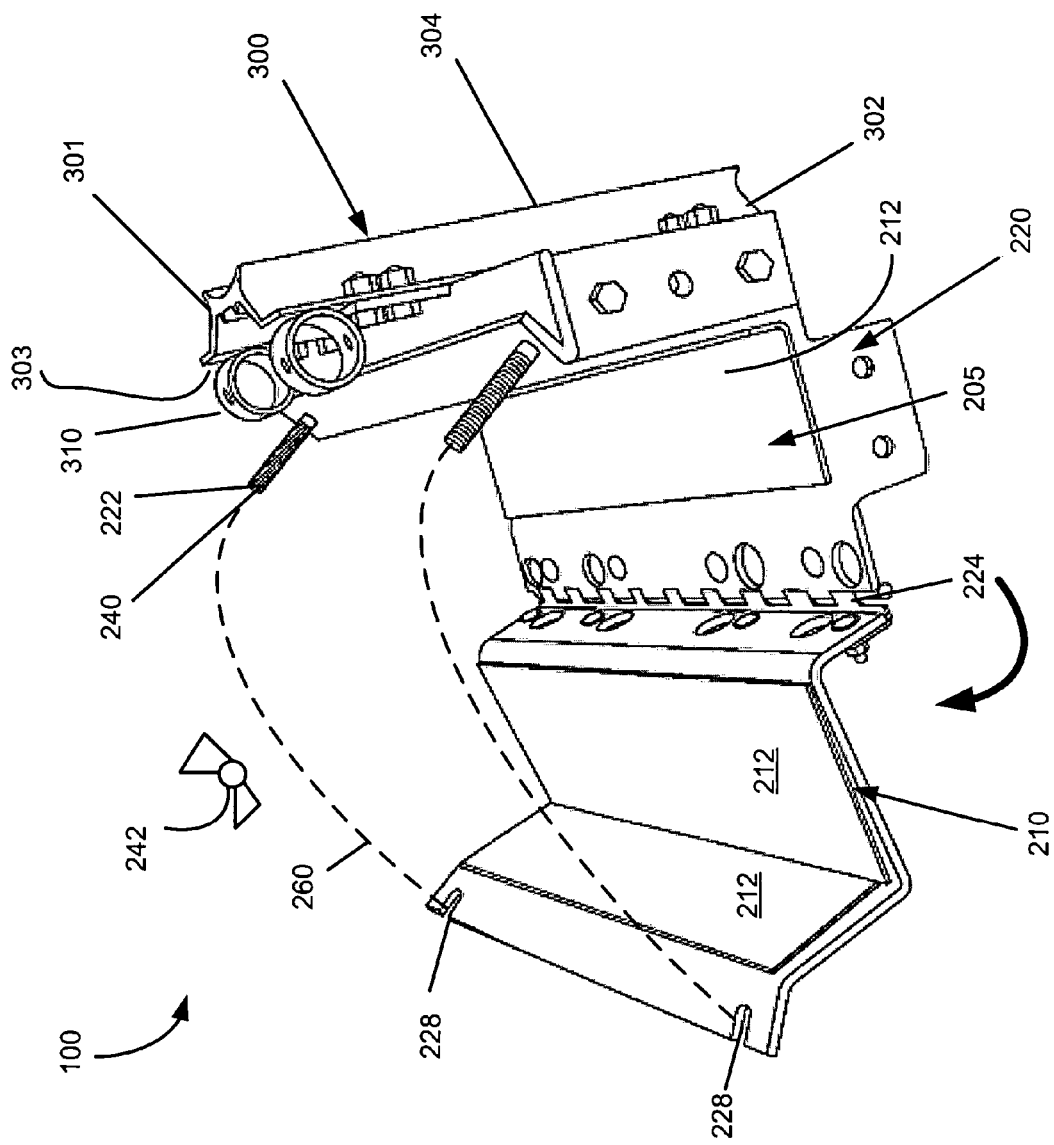
FIG. 4 depicts a side perspective view of another embodiment of the support system, in accordance with a preferred embodiment of the present invention.

As illustrated in FIG. 3, the housing 210 of the securing assembly 200 can be a three-sided housing, wherein a locking device 220 can be sealable at the top 250 of the housing 210. In an alternative embodiment, as illustrated in FIG. 4, the locking device 220 can form the housing 210. The embodiment of FIG. 4 illustrates a two-side housing 210, wherein the locking device 220 creates the remaining two sides to secure a supporting arm 105.

The locking device 220 of the securing assembly 200 can secure the supporting arm 105 in the housing 210. Indeed, the fastening elements 222 can lock the locking device 220 of the securing assembly 200. The locking device 220 can be in communication with the housing 210 via a hinge member 224. The hinge member 224 can, preferably, span the length of the housing 210 and the locking device 220 for optimal locking functionality.

The locking device 220 can be adapted to secure the supporting arm 105 within the housing 210 with the fastening element 222. Preferably, the locking device 222 can be secured with a fastening element 222. The fastening element 222 can include a clamping device 226 or aperture/bolt system.

FIG. 3 illustrates the clamping device 226 which can secure to the housing 210. The clamping device 226 can be adapted to snap into an aperture 228 on the housing 210. Upon snapping the clamping device 226 into the aperture 228, the locking device 220 is locked.

In another embodiment, as illustrated in FIG. 4, the locking device 220 can include an aperture 228 to receive a fastening element 222. Preferably, the fastening element 222 can be an extending bolt 240 connected to the housing 210. The bolt 240 can be received by the aperture 228 of the locking device 220, as depicted by dashed lines 260. The rotation about the hinge member 224 enables this fastening. After the aperture 228 receives the bolt 240, a nut 242, preferably a wing nut is used to ease the task of the linemen wearing thick, insulated gloves, can be secured to the bolt 240 ensuring locking of the locking device 220. The clamping device 226, the bolt 240, and the nut 242 are preferably manufactured with galvanized or stainless steel, as to survive harsh environments and reducing the possibility of rusting. One skilled in the art would appreciate that the locking device 220 can be secured with other similar devices.

FIG. 4 illustrates another embodiment of the present invention. Unlike the embodiment illustrated in FIG. 3, wherein the locking device 220 includes a lock top, the embodiment in FIG. 2 illustrates the locking device 220 as part of the housing 210. The locking device 220 is hinged with a hinge member 224, and can be sealed to create two sides of the housing 210 for the supporting arm 105 to be secured. The locking device 220 of the support system 100 has the hinge member 224 positioned in the front 255 of the housing 210. The locking device 220 includes at least two apertures 228 to receive the bolts 240. Preferably, the bolts 240 are secured with wings nuts 242, making it easier for linemen to lock and unlock the locking device 220. The bolts 240 are preferably positioned on the top 250 of the housing 210.

Figure 5:
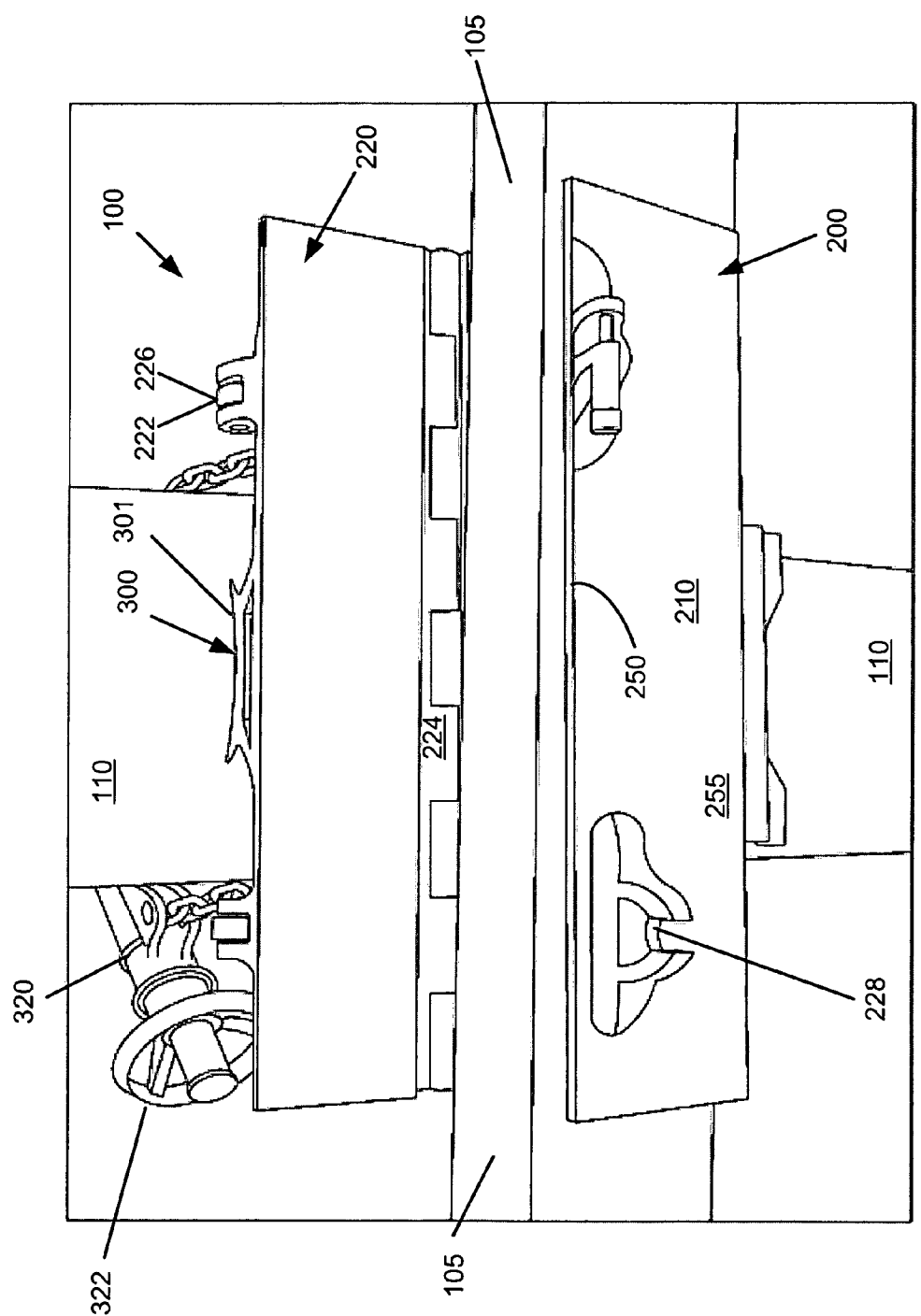
FIG. 5 depicts a front perspective view of the support system including a supporting arm, in accordance with a preferred embodiment of the present invention.

Referring now to FIG. 5, which is similar to FIG. 2, the support system 100 is illustrated with a supporting arm 105 positioned inside the pathway 205 of the housing 210. In a supporting arm 105 being approximately 12 feet in length, for example, it is preferred that one side of the supporting arm not span more than 7 feet. This prevents overweighing one side, and the potential release of the supporting arm 105 by the securing assembly 200. One skilled in the art would appreciate that the dimensions and materials of the supporting arm 105 can vary. While it is preferred that the supporting arm 105 be approximately 12 feet in length and be manufactured with fiberglass, the support system 100 can support shorter or longer arms 105 and made of other materials.

Figure 6:
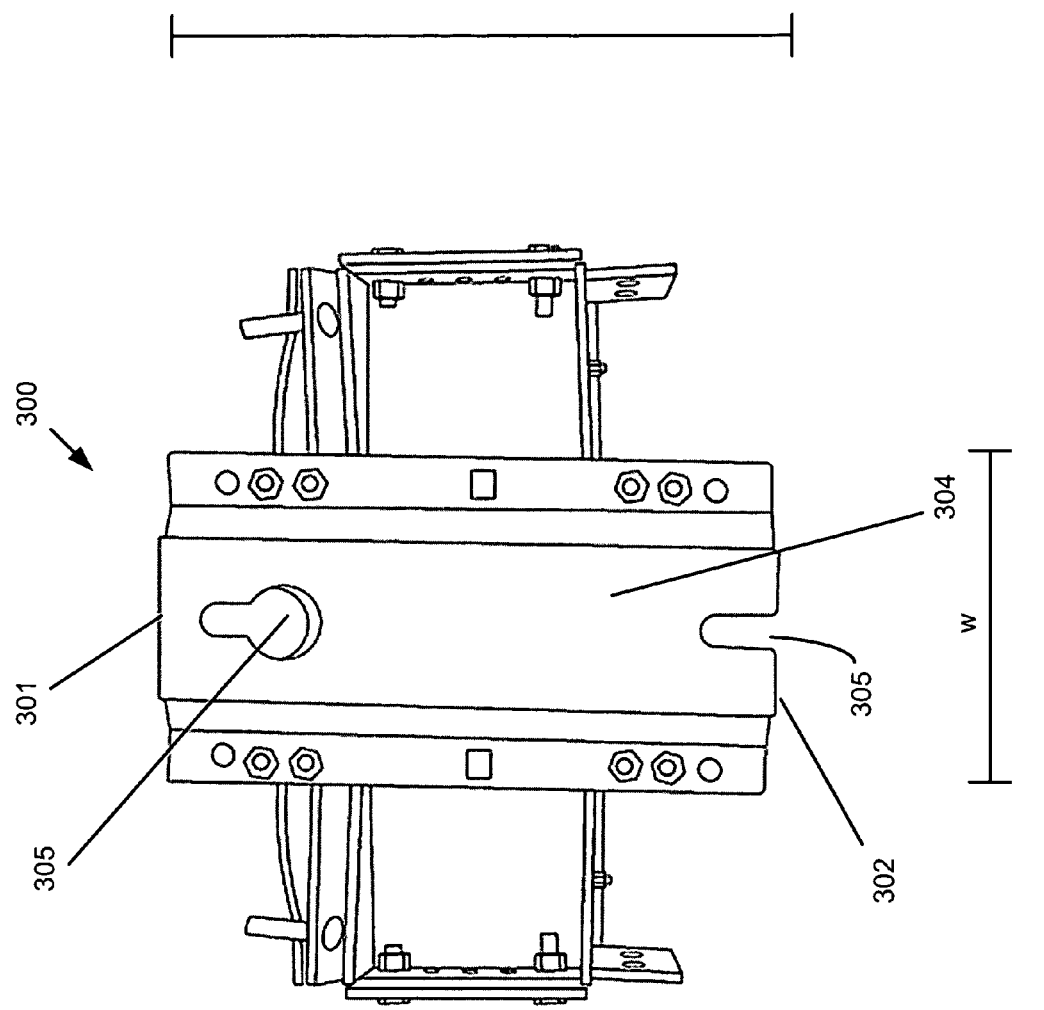
FIG. 6 depicts a rear view of a mounting member of the support system, in accordance with a preferred embodiment of the present invention.

Referring now to FIG. 6, the support system 100 further includes a mounting member 300. The mounting member 300 can have a length (l) and width (w). The mounting member 300 is the device that attaches the securing assembly 200 of the support system 100 to the pole 110. Indeed, the mounting member 300 is in communication, often coupled by bolts, with the securing assembly 200.

The mounting member has a top 301, bottom 302, front 303 and rear 304. The mounting member 300 can include at least one bolt-receiving aperture 305 and a chain receiving pathway 310. The mounting member 300 can be made of aluminum, galvanized steel, stainless steel, and the like, wherein the material of the mounting member 300 is weatherproof.

One method of attaching and securing the mounting member 300 the pole 110 is to insert a bolt having a head into the pole 110. The head of the bolt can then be received by the apertures 305 of the mounting member 300, wherein the support system 100 can be secured to the pole 110. In a preferred embodiment, the aperture 305 has a U-shape. At least one aperture 305 can be cooperatively shaped to receive the bolt of the pole 110.

If the boring of a bolt into the pole is not possible, or not preferred, a chain 315 can be wrapped around the pole 110 and received by the chain receiving pathway 310. The chain receiving pathway 310 enable the placing of the support system 100 in and around obstructions on the pole 110, such as inductors, transformers, and other pole utility devices.

Figure 7:
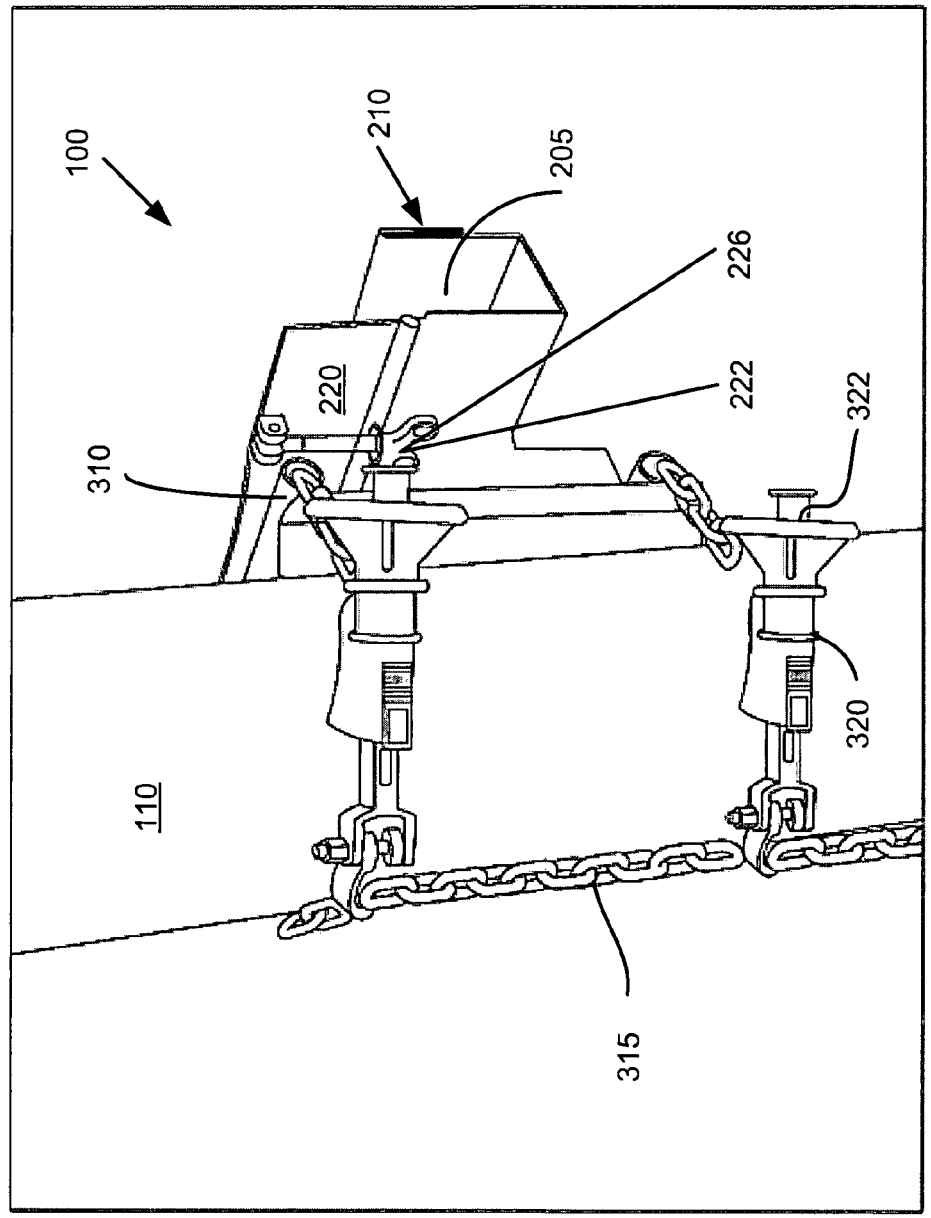
FIG. 7 depicts the support system secured to a utility pole, in accordance with a preferred embodiment of the present invention.

As illustrated in FIG. 7, the chain receiving pathway 310 can be placed at the top 301 and, additional the bottom 302 of the front 303 of the mounting member 300. The chain 315 can be wrapped around the pole 110 and can be tightened to the pole 110 with a tightening mechanism 320. By twisting the handle 322 of the tightening mechanism 320, the chain engages the pole 110 tightly ensuring the attachment of the support system 100 to the pole 110.

Figure 8:
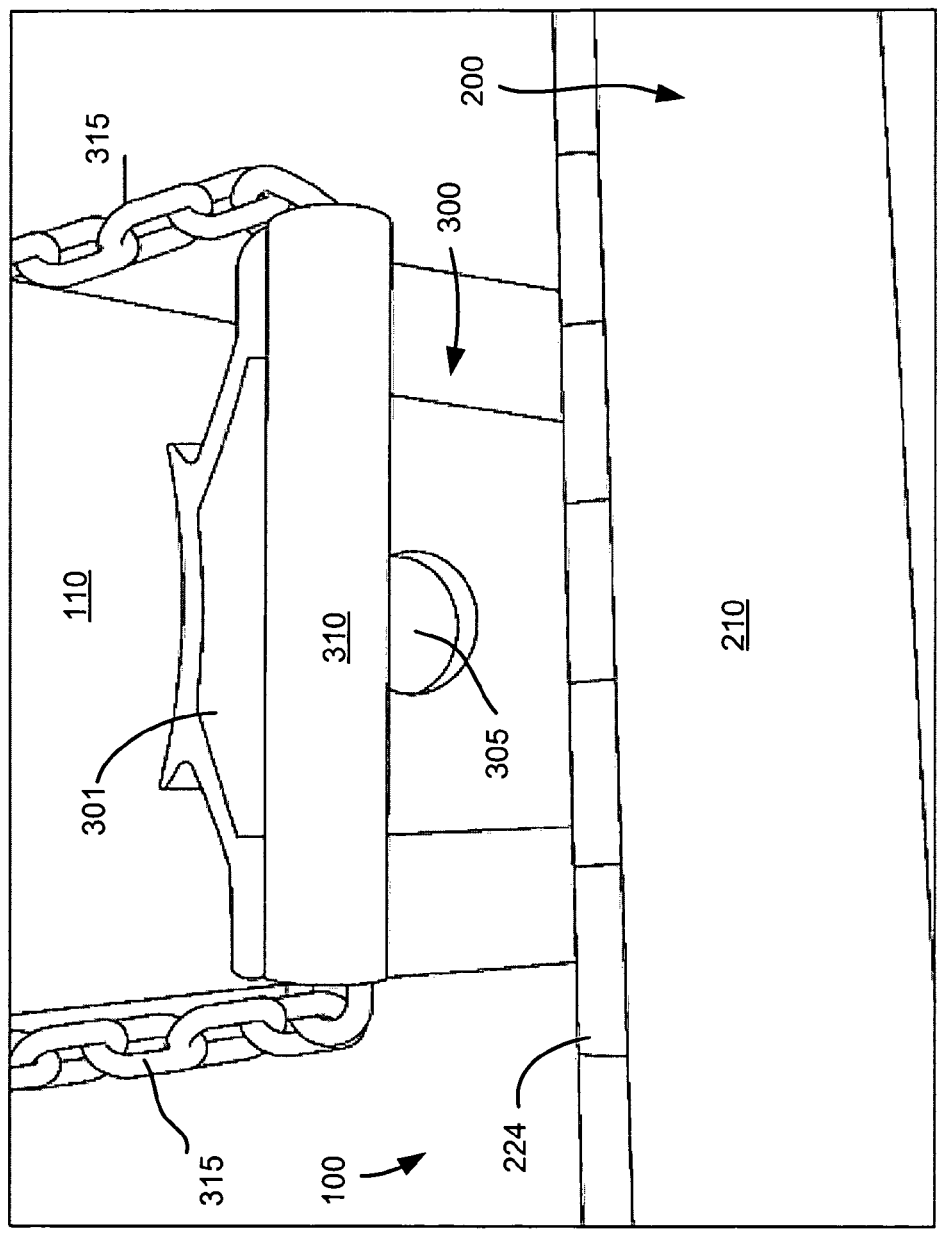
FIG. 8 depicts a close-up view of a front view of a portion of the mounting member of the support system, in accordance with a preferred embodiment of the present invention.

FIG. 8 illustrates that the rear 304 of the mounting member 300 can be implemented to fit the shape of the pole 110. For instance, for a round pole 110, the rear 304 of the mounting member 300 can be curved to fit flush with the pole 110. The shape of the rear 304 of the mounting member 300 can be, for instance, V-shape, curved and flat, based on the pole 110 to receive the support system 100. One skilled in the art would appreciate that the shape of the rear 304 of the mounting member 300 can be many different shapes, widths and lengths, depending on the shape of the pole 110.

Figure 9:
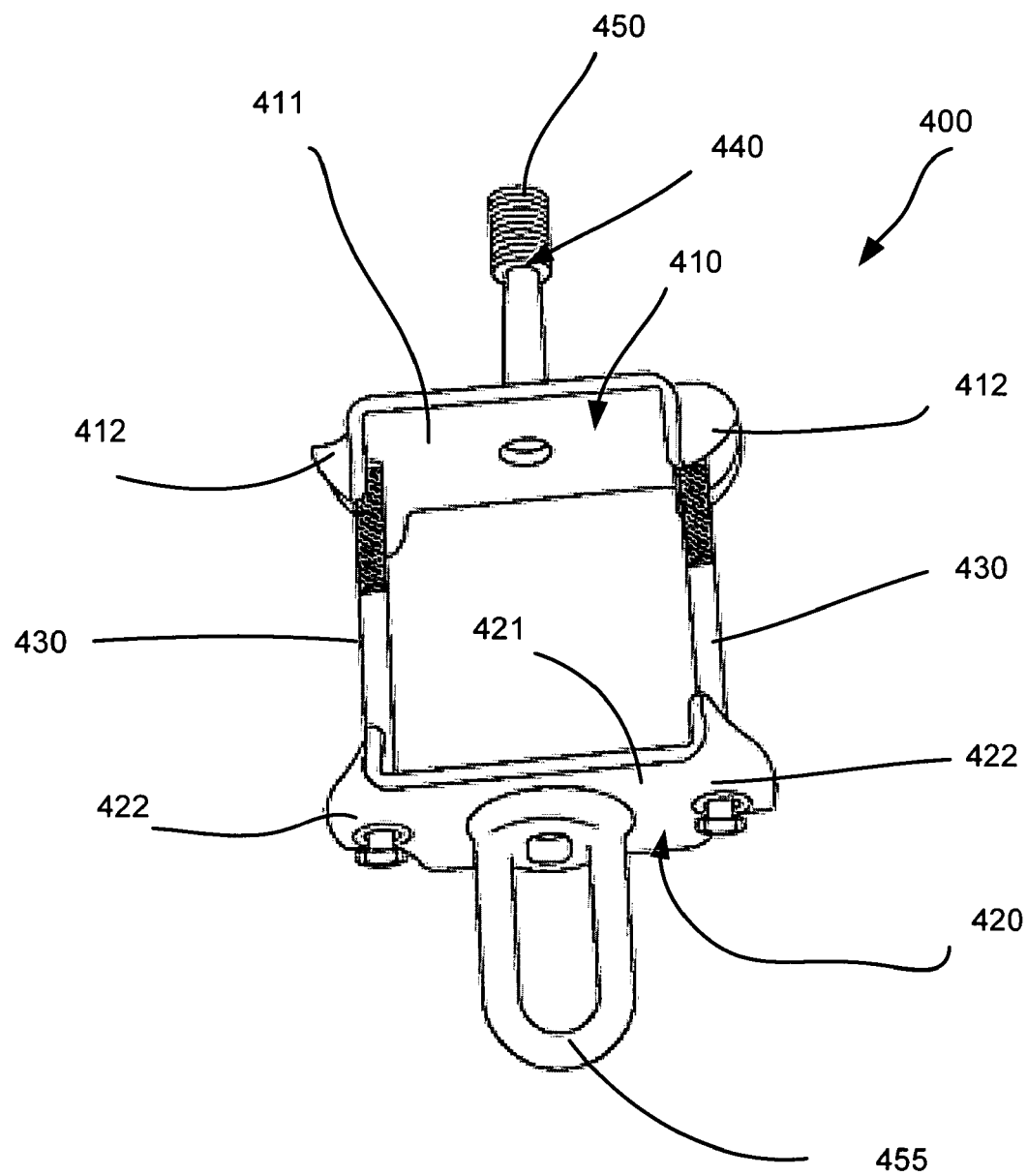
FIG. 9 depicts a perspective view of an insulator saddle, in accordance with a preferred embodiment of the present invention.

Referring now to FIG. 9 illustrates a perspective view of an insulator saddle 400. The saddle 400 is a device that further enhances the supporting arm 105, as the saddle 400 can secure and hold utility lines, without the need of boring holes into the supporting arm 105, i.e., a non-boring assembly. Consequently, the use of the saddle 400 enables recycling of the supporting arm 105, as the arm 105 can be reused. The recycling of the arm 105 does not affect the stability of the arm 105, but can result in a cost savings to the utility company.

The saddle 400 includes a first seat 410 and a second seat 420. The first seat 410 and the second seat 420 are in communication via at least two bolts 430. The bolts 430 extend from the first seat 410 to the second seat 420.

The seats 410 and 420 have a length 411 and 421 that span across the supporting arm 105, wherein the seats 410 and 420 are held onto the arm 105. Additionally, the seats 410 and 420 include a normal extending members 412 and 422 at the ends of the lengths 411 and 421. The members 412 and 422 form edges of the seat for the seats 410 and 420 to rest upon the arm 105. The members 412 and 422 can be positioned normal to the lengths 411 and 421 for optimal seat 410 and 420 security to the supporting arm 105.

The first seat 410 and the second seat 420 can include many different connectors 440 and the like. For instance, the seats 410 and 420 can include an insulator pin to hold conductors, a dead end eye, a brace, a snatch block, a conductor roller, and the like. FIG. 8 has an insulator pin 450 on the first seat 410 and a dead end eye 455 on the second seat 420. Preferably, the insulator pin 450 sits on top of the supporting arm 105 to secure a conductor 460, while the dead end eye 455 extends downward from the supporting arm 105.

The seats 410 and 420 each include at least two apertures. The apertures are adapted to receive the bolts 430. The bolts 430 can be secured to the seats 410 and 420 by a nut. One skilled in the art would recognize that the seats 410 and 420 can be secured to the supporting arm 105 by many other convenient and temporary methods.

Figure 10:
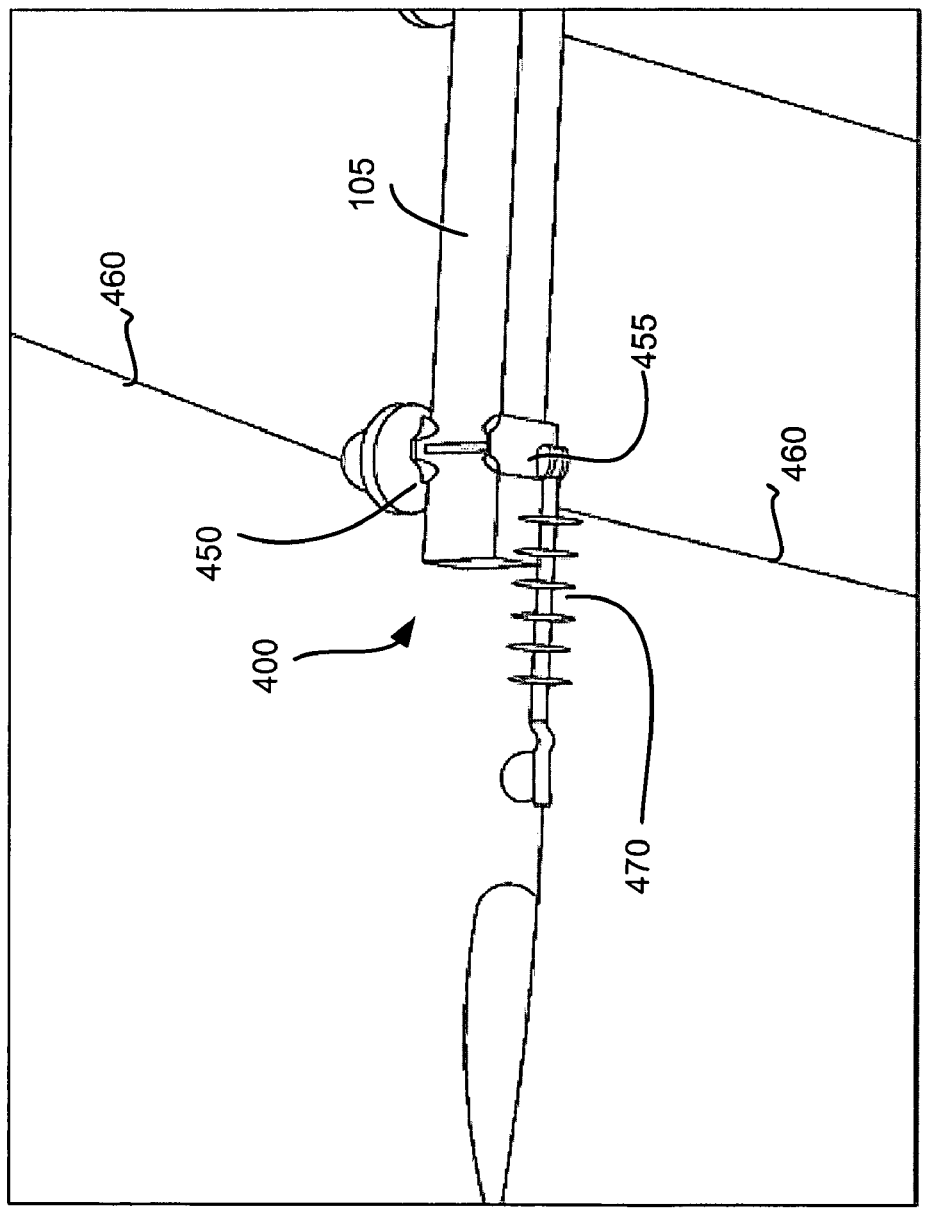
FIG. 10 depicts a perspective view of the insulator saddle attached to the support arm, in accordance with a preferred embodiment of the present invention.

FIG. 10 illustrates a close up view of the saddle 400 positioned on a supporting arm 105. The saddle has an insulator pin 450 on the first seat 410 and a dead end eye 455 on the second seat 420. The insulator pin 450 secures the conductor 460 in place. The dead end eye 455 secures an inductor 470 to distribute electricity to a structure.

Figure 11:
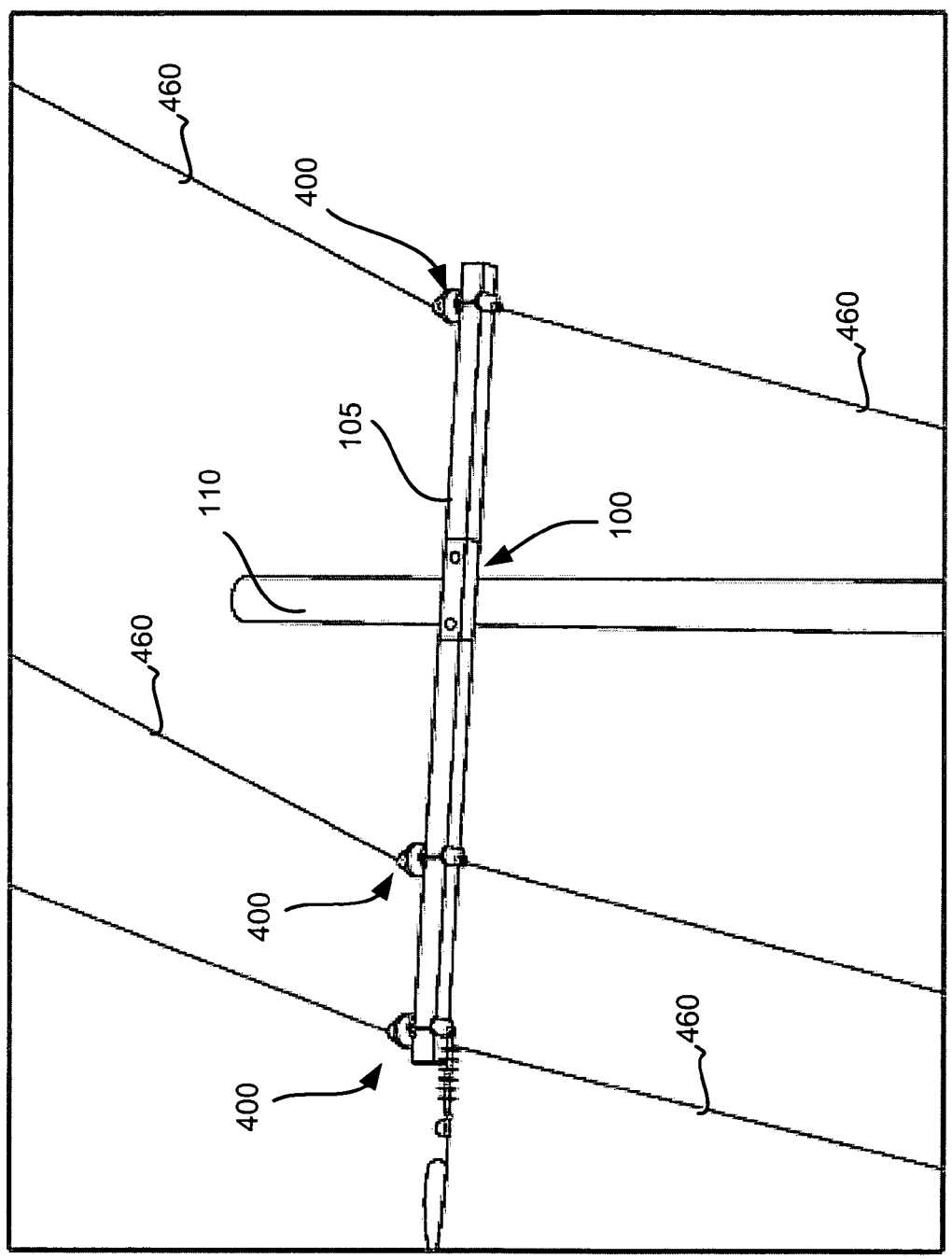
FIG. 11 depicts a perspective view of the insulator saddle attached to the support arm, which is secured to the utility pole by the support system, in accordance with a preferred embodiment of the present invention.

FIG. 11 illustrates the support system 100 in a preferred arrangement securing a supporting member 105 to a pole 110, wherein the supporting member 105 includes three saddles 400. Preferably, there are two saddles 400 on one side of the pole 110 on the supporting arm, and one saddle 400 on the other side of the pole 110 on the supporting arm 105. Alternatively, there can be three saddles 400 on one side of the pole 110 on the supporting arm 105, and no saddles 400 the other side of the pole 110 on the supporting arm. Other arrangements of saddles 400 are possible depending on the number of conductors 460 to be supported by the arm 105.

FIG. 12A illustrates a side view of another preferred embodiment of the saddle 400. The first seat 410 can be angled to receive the supporting arm 105, while the second seat 420 can be flat. The seats 410 and 420 can further include a liner to prevent slippage of the saddle 400 from the supporting arm 105.

FIG. 12B illustrates a top view of the FIG. 12A embodiment, wherein the two bolts 430 are illustrated with the insulator pin 450. The insulator pin 450 can secure the conductor 460 above the supporting arm 105.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A non-boring support system for supporting a temporary supporting arm for use in a reconducting process in a normal orientation to a utility pole, the non-boring support system comprising:
   a securing assembly having a housing defining a pathway for receiving the supporting arm such that the orientation of the supporting arm to the utility pole can only be normal when the securing assembly is secured to the utility pole, the securing assembly having a locking device for releasably securing at least a portion of the supporting arm within the housing of the securing assembly;
   a non-boring mounting assembly coupled to the securing assembly for releasably securing the securing assembly to the utility pole, the mounting assembly having a flexible fastening element, mounting aperture, and a tensioner element, the flexible fastening element passing through the mounting aperture and wrapping substantially around the utility pole, the tensioner element adjusting the tension in the flexible fastening element to tighten the flexible fastening element around the utility pole;
   a liner disposed on a surface of the pathway, the liner increasing the frictional force between at least a portion of the supporting arm and the pathway
   a saddle receiving the supporting arm, the saddle providing insulation from a conductor to the supporting arm, the saddle comprising a first seat and a second seat, the first seat of the saddle comprising a first connector and the second seat of the saddle comprising a second connector, wherein the first connector of the first seat is an insulator pin that insulates the conductor from the supporting arm.

2. A non-boring support system for supporting a temporary supporting arm for use in a reconducting process in a normal orientation to a utility pole, the non-boring support system comprising:
   a securing assembly having a housing defining a pathway for receiving the supporting arm, the housing having a bottom surface, a top surface, a back surface, and a front surface, the top and front surfaces hingedly connected to the bottom surface, the securing assembly having a locking device for releasably securing at least a portion of the supporting arm within the housing of the securing assembly;
   a non-boring mounting assembly for releasably securing the securing assembly to the utility pole;
   a saddle releasably attached to the supporting arm, the saddle receiving a conductor; and
   a liner disposed on a surface of the pathway, the liner increasing the frictional force between at least a portion of the supporting arm and the pathway.

3. The non-boring support system of claim 2, the saddle attachable to the supporting arm at a plurality of points along the length of the supporting arm not within the housing.

4. The non-boring support system of claim 2, the saddle comprising a first element and a separate second element, the first element coupled to the second element by one or more connecting elements.

5. The non-boring support system of claim 2, the securing assembly coupled directly to the mounting assembly.

6. The non-boring support system of claim 2, wherein a portion of the mounting assembly cooperatively fits the shape of the utility pole for flush fitting with the utility pole.

7. A non-boring support system for supporting a temporary supporting arm for use in a reconducting process in a normal orientation to a utility pole, the non-boring support system comprising:
   a securing assembly having a housing defining a pathway for receiving the supporting arm, the pathway having a bottom surface, a top surface, a back surface, and a front surface, the bottom surface oriented orthogonally to the front and back surfaces, the top surface hingedly connected to the back surface, the pathway having a first longitudinal axis, the securing assembly having a hinged locking device for releasably securing at least a portion of the supporting arm within the housing of the securing assembly; and
   a mounting assembly coupled to the securing assembly for releasably securing the securing assembly to the utility pole, the mounting assembly having a first attachment pathway and a second attachment pathway, the first attachment pathway having a second longitudinal axis and the second attachment pathway having a third longitudinal axis, the first, second, and third longitudinal axes oriented substantially parallel, the first attachment pathway disposed above the housing, the second attachment pathway disposed below housing, the mounting assembly having a first elongate flexible member coupled to a first tensioner element and a second flexible member coupled to a second tensioner element, the first flexible member passing through the first attachment pathway and substantially wrapping around the utility pole, the second flexible member passing through the second attachment pathway and wrapping substantially around the utility pole, the first tensioner element having a first rotatable member for increasing the tension in the flexible member to tighten the first flexible member and attach the securing assembly to the utility pole, the second tensioner element having a second rotatable member for increasing the tension in the flexible member to tighten the second flexible member and attach the securing assembly to the utility pole; and a liner disposed on the first surface, the liner increasing the frictional force between the supporting arm and the second surface.

8. The non-boring support system of claim 7, further comprising a saddle releasably attached to the supporting arm, the saddle receiving a conductor.

9. The non-boring support system of claim 7, the securing assembly coupled to the mounting member, the securing assembly having a single orientation relative to the mounting member.

10. The non-boring support system of claim 2, further comprising a chain adapted to extend around the utility pole and engage with the mounting member to secure the mounting member to the utility pole.

* * * * *